March 4, 1952 W. A. SMITH 2,588,170
SECONDARY BATTERY
Filed July 5, 1949
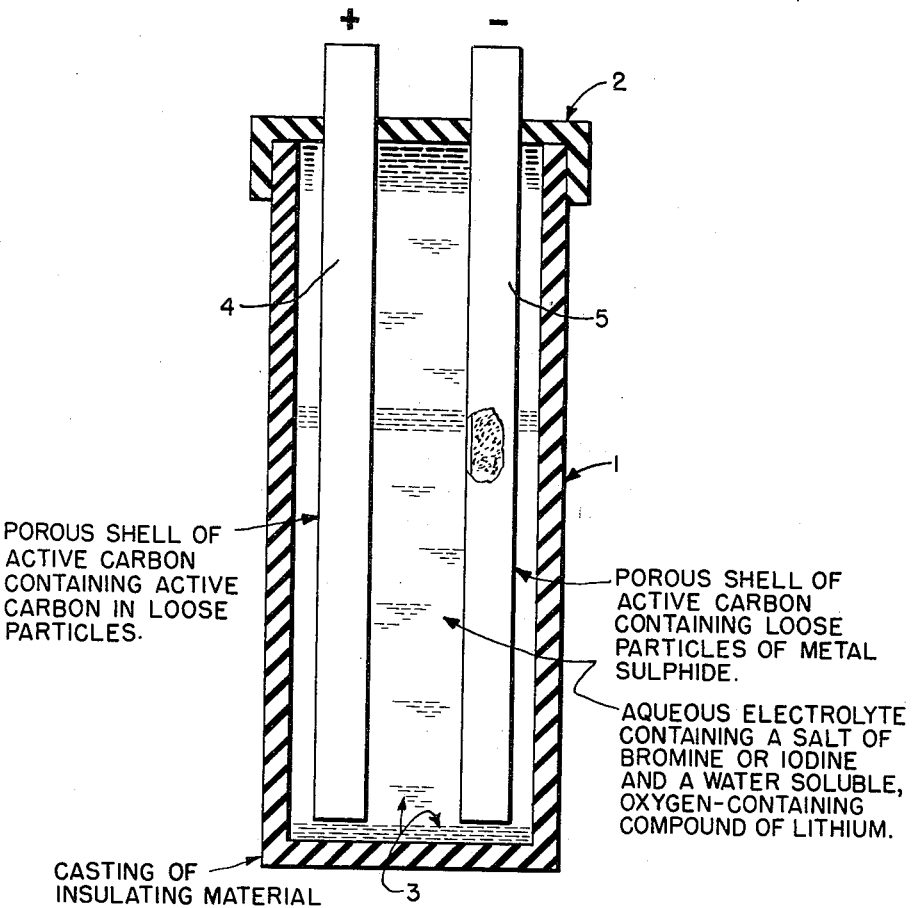
*INVENTOR.*
WILLIAM ALVAH SMITH
BY Max D. Farnier
ATT'Y.

Patented Mar. 4, 1952

2,588,170

UNITED STATES PATENT OFFICE 2,588,170

SECONDARY BATTERY

William Alvah Smith, Pittsburgh, Pa.

Application July 5, 1949, Serial No. 103,180

7 Claims. (Cl. 136—6)

This invention relates to secondary batteries, also called storage or accumulator batteries. The usual storage battery cell contains a positive grid or grids, a negative grid or grids, and an electrolyte into which the grids extend. There are only two types of storage batteries in common use. One is the lead grid, sulphuric acid electrolyte type, having a normal discharge voltage of about two volts, and the other is the Edison type (nickel-iron) using a modified potassium hydroxide as the electrolyte and having a normal discharge voltage of about 1.2 volts.

I have discovered a new type of storage battery which has many advantages of both types, and is exceptionally simple, efficient, durable, practical and inexpensive.

In the accompanying drawing I have illustrated in sectional elevation and diagrammatically a storage battery embodying this invention.

In accordance with this discovery, active carbon is employed as the positive pole or grid; a metallic substance having a component which is capable of reacting or uniting with the metallic ion of the electrolyte is employed as the negative pole or grid; and the electrolyte is an aqueous solution of a bromine or iodine salt of a metal, modified when desired by an organic compound containing nitrogen in the tri-valent state, such as, for example, the various methyl and ethyl amines, including monomethyl amine, dimethyl amine, trimethyl amine, monoethyl amine, diethyl amine, triethyl amine, monoethanol amine, aniline, anthranilic acid, amino acetic acid, ammonium bromide, or by a water soluble compound of an alkaline substance such as for example lithium oxide or hydroxide, potassium hydroxide, sodium hydroxide, and in some cases nitrogen containing alkaline or basic substance. Solutions of chlorine and fluorine salts may be used also as the electrolyte, but at present they are not as satisfactory as salts of bromine and iodine because active carbons now on the market are not sufficiently resistant to chlorine and fluorine, and as a result cells using chlorine or fluorine salts have a shorter life than cells using bromine and iodine salts.

By the expression "active carbon" is meant any carbon that will adsorb bromine or iodine ions under charge conditions, and release them to the electrolyte under discharge conditions. Graphite appears to be naturally active, and many active carbons are available in the market under the designation "activated carbon" which presumably have been deliberately "activated" by any of several different methods such as by treatment with super-heated steam, hot gases or heat. The active carbon is usually finely divided or granular and in such case may be confined in an elongated porous thimble of alundum, plastic or some other porous or permeable wall or housing that is inert to the chemical changes occurring in the cell during charging and discharging thereof. One convenient type of conductor for the active carbon is a solid slender rod of carbon extending into the thimble substantially close to the bottom thereof and surrounded by and in contact with the active carbon. An electrical connection is made to the outer end of the carbon rod. An active carbon rod may be used for this purpose also. The negative pole may be made of a metal grid such as is used in the Edison type cell, or if convenient, another porous or permeable thimble of alundum, plastic, or other relatively inert material may be filled with a loose metallic compound or substance, with a metallic conductor extending nearly to the bottom of this other thimble and formed outside of the thimble for an electrical connection.

The active material of the negative grid or pole may advantageously be a metal sulphide, a relatively pure metal, or an oxide of a metal, or Edison iron grid. Sulphides of metals such as of iron, lead, copper, zinc and cadmium, and iron (ferrous) oxide are particularly useful as the active material of the negative pole. Magnesium is also an excellent metal for the negative pole or grid and, when used, the electrolyte may advantageously contain a halide of magnesium such as magnesium bromide or iodide. Aluminum also has been used.

In the illustrated embodiment of the invention, the improved storage cell is composed of an insulation material forming a shell or casing 1 closed by a cover 2, and containing an aqueous electrolyte carrying a salt of bromine or iodine and if preferred a water soluble, oxygen-containing compound of lithium. This electrolyte 3 provides metallic ions which when the battery is on charge, migrate to the negative pole and the halogen ions of the electrolyte migrate to the positive pole. Preferably the salt is an alkaline metal salt. Supported by the cover 2 and depending into the electrolyte are a positive pole 4 of active carbon and a negative pole 5 containing a metallic substance with a component which is capable of reacting or uniting with the metallic ion of the electrolyte, such as a metal sulphide. The positive pole 4 may be a tubular rod of active carbon with apertures therein and containing loose particles of active carbon. The negative pole 5 may be a porous shell of insulating material containing loose particles of metal sulphide, such as iron sulphide.

In a battery made in accordance with this discovery, and employing a metal salt of bromine or iodine, on charge, halogen ions of the electrolyte migrate to the positive pole of active carbon, and the metallic ions of the electrolyte migrate to the negative pole. The action between the metallic ions of the electrolyte and the negative pole is not understood in all cases, but for want of a better expression to describe it, I have referred to a union of the electrolyte ions with a component of the negative pole. On discharge of the cell, the bromine or iodine ions are released from and leave the active carbon, and the negative pole reverts to its original state or to a state similar to the original state. In a battery on charge using, for example, a solution of a salt of potassium as the electrolyte and ferrous oxide as the negative pole, the potassium frees the oxygen from the iron oxide pole, and because $K_2O$ cannot exist except momentarily in water solution, the $K_2O+H_2O$ forms $2KOH$. The potassium ion, in other words, returns to the electrolyte and the iron oxide is reduced to metallic iron. On discharge of the battery, the OH ions formed in the electrolyte by the $K_2O$ react with the metallic iron to form a hydroxide of iron such as $Fe(OH)_2$ which apparently becomes $FeO+H_2O$ again although it may possibly remain in the $Fe(OH)_2$ state. The ideal negative pole is one to which the electrolyte metallic ion will unite directly. In other words, the negative pole is a metal or metallic salt which will react with the metallic ion of the electrolyte when the battery is being charged, and revert to a state similar to its original state on discharge, but not necessarily exactly its original state.

A large number of small batteries were made up in accordance with this discovery, and given similar tests to determine their relative characteristics. Each was charged at 0.15 amp. and whatever voltage was required to cause this current to pass through the battery, for a period of thirty minutes. The "start" or cell voltage was next determined, and the battery then discharged for four minutes through a 0.25 amp. lamp, noting voltage and amperage at the beginning, at the ends of the 1st and 4th minutes, after which the lamp was cut out, and the "end" battery voltage determined. The amperage and voltage data thus obtained enabled the watt minutes discharge to be determined. A second thirty minute charge at .15 ampere rate was then run into the battery, following which the battery voltage was measured, then the battery was discharged for nine minutes through the .25 amp. lamp thus enabling one to determine the discharge watt minutes after the second thirty minute charge. The voltage at the finish of the discharge was then read.

In cells employing potassium bromide as the electrolyte, and a negative pole of ferrous sulfide, of the various strengths of electrolyte tested, a concentration of 0.3 gram mols of potassium bromide per 100 cc. of electrolyte gave excellent results. In one test a 0.252 gram mol concentration per 100 cc. of electrolyte permitted an almost constant charger voltage of around 2.6 volts, regardless of the degree of charge of the battery, for the charge amperage used. This relatively constant and low charger voltage is considered commercially important by charger manufacturers. In the above mentioned 0.3 gram mol concentration of potassium bromide per 100 cc. of electrolyte, the actual bromine present is very close to 23.97 grams in the 100 cc. of electrolyte; in transferring from one metallic salt to another, the concentration of the halogen ion was kept substantially constant, except when deliberately changed for experimental reasons.

The batteries using halogen compounds in the electrolyte gave results in order of desirability as follows: Bromine compounds were first in desirability, iodine compounds next best, then fluorine and then chlorine.

The voltages developed by batteries using chlorine and fluorine compounds in the electrolyte were excellent, but commercially fluorine and chlorine salts were least satisfactory because of their tendency to damage the carbon.

In the negative poles or grids, the metal sulphides were found generally superior to other materials used at present in making battery grids. Batteries having magnesium grids as the negative pole or grid and used with an electrolyte containing magnesium bromide, were characterized by relatively high initial voltages, relatively constant voltages over wide charge and discharge ranges and high capacity. These magnesium containing batteries, when tri valent nitrogen containing organic compounds were introduced into the electrolyte developed relatively high discharge capacity.

It will be understood that the specific materials and conditions which have been herein before discussed, were given as examples to illustrate the principle of the discovery, and other materials and conditions may be used within the scope of the appended claims.

I claim:

1. A secondary battery comprising a receptacle having therein an aqueous electrolyte containing a salt of a halogen selected from the group of bromine and iodine, a positive pole containing active carbon, and a negative pole containing a metallic sulfide with a component capable of uniting with the metallic ion of the electrolyte upon charge, said carbon and metallic sulfide being loose particles confined to a separate electrical conductor for the carbon and another for the metallic substance, and exposed to said electrolyte.

2. A secondary battery comprising a receptacle having therein an aqueous electrolyte containing a salt of a halogen selected from the group of bromine and iodine, a positive pole containing active carbon, and a negative pole containing a sulphide of a metal having a component that is capable of uniting with the metallic ion of the electrolyte during charging.

3. A secondary battery having a negative pole containing a metal sulphide.

4. A secondary battery comprising a receptacle having therein an aqueous electrolyte containing a water soluble oxygen containing compound of lithium and a salt of a halogen from the group of bromine and iodine, a positive pole containing active carbon, and a negative pole containing a sulfide of a metal having a component which will unite with the metallic ion of the electrolyte during charging.

5. A secondary battery having as an electrolyte, an aqueous solution of a metal salt of a halogen from the group of bromine and iodine, a positive pole of active carbon, and a metallic sulphide as a negative pole.

6. A secondary battery having a positive pole of active carbon and a negative pole of metallic sulphide.

7. A secondary battery having an aqueous electrolyte containing an alkali metal combined with a halogen from the group of bromine and iodine, a positive pole of active carbon, and a negative pole of a metal sulphide.

WILLIAM ALVAH SMITH.

REFERENCES CITED

The following references are of record in the file of this patent:

UNITED STATES PATENTS

| Number | Name | Date |
|---|---|---|
| 744,216 | Lyons | Nov. 17, 1903 |
| 870,973 | Little | Nov. 12, 1907 |
| 1,299,693 | Edison | Apr. 8, 1919 |
| 1,377,722 | Marconi | May 10, 1921 |
| 1,662,866 | Salazar | Mar. 20, 1928 |
| 2,078,143 | Jamau | Apr. 20, 1937 |

FOREIGN PATENTS

| Number | Country | Date |
|---|---|---|
| 2,823 | Great Britain | of 1881 |
| 283,559 | Great Britain | Apr. 12, 1928 |
| 457,806 | Great Britain | Dec. 7, 1936 |
| 754,065 | France | Oct. 31, 1933 |

OTHER REFERENCES

Schleicher, Std. Handbook for Elec. Engrs., 7th ed. (1941), page 2013.